UNITED STATES PATENT OFFICE.

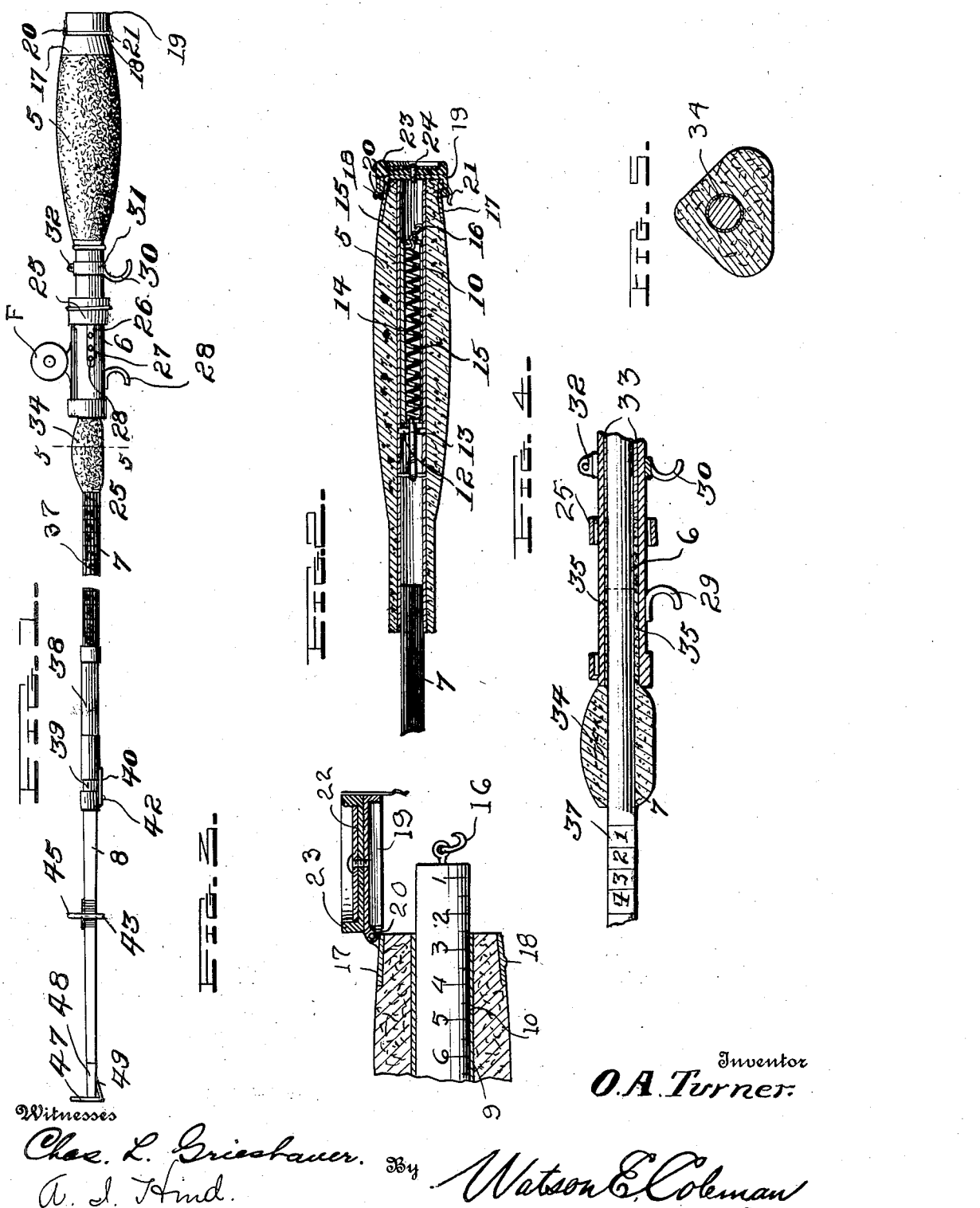

ORTON A. TURNER, OF COLDWATER, MICHIGAN.

FISHING-ROD.

1,113,847.      Specification of Letters Patent.      Patented Oct. 13, 1914.

Application filed October 14, 1912. Serial No. 725,684.

*To all whom it may concern:*

Be it known that I, ORTON A. TURNER, a citizen of the United States, residing at Coldwater, in the county of Branch and State of Michigan, have invented certain new and useful Improvements in Fishing-Rods, of which the following is a specification, reference being had to the accompanying drawings.

This invention relates to fishing rods and has for one of its objects to provide a sectional fishing rod embodying many features of novelty whereby devices of this character are rendered more serviceable and convenient in use.

A further object of the invention resides in the provision of a fishing rod having a hollow handle in which a spring balance scale is arranged, and an improved butt cap hingedly secured upon the end of the handle to close the same.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a fishing rod constructed in accordance with the present invention; Fig. 2 is an enlarged longitudinal section of the rear hand grip; Fig. 3 is an enlarged detail section of the hinged butt cap; Fig. 4 is an enlarged longitudinal section through the reel seat and the hand grip illustrating the manner of connecting the same to the hollow handle by means of one of the rod sections; Fig. 5 is a section taken on the line 5—5 of Fig. 1.

Referring in detail to the drawings, 5 designates the rear hand grip which may be constructed of light wood or other materials commonly used in the art.

6 designates the reel seat, and 7 and 8 indicate the rod sections which are adapted to be connected in any usual or preferred manner.

Referring now more particularly to the handle 5, 9 indicates the longitudinal bore thereof into one end of which the inner end of the rod section 7 extends. To this end of the rod section 7 a tube 10 is secured, the exterior diameter of said tube being substantially the same as the diameter of the bore 9. This tube extends entirely through the hand grip 5 and at its end is flush with the end of said rear hand grip. The hand grip 5 is secured upon the tube 10 in any preferred manner. A transversely disposed pin 12 is fixed at its ends in the tube 10 and upon said pin a link 13 is engaged. One end of a contractile spring 14 is secured to this link. This spring is normally inclosed within a sleeve 15 which is longitudinally movable in the tube 10. The outer end of said sleeve is closed and to the same the outer end of the spring 14 is secured. To this closed end of the sleeve 15 a hook 16 is attached from which a fish or other article to be weighed may be suspended. The sleeve 15 is provided upon its exterior with a graduated scale, such graduations being adapted to register with the outer open end of the tube 10.

Upon the butt end of the hand grip 5, a metal band or collar 17 is secured and is provided upon its exterior with an annular rib or bead 18. Upon the rear edge of this metal band, the butt cap generally indicated by the numeral 19, is hinged as shown at 20. This butt cap consists of a shallow metal cylinder closed at one end. This cap is adapted to engage over the end of the metal band 17 and is provided with a spring catch 21 having a notch therein to engage over the bead 18. To the closed end of the butt cap 19 a rubber disk 22 is secured. This disk is provided at its outer edge with an annular bead 23 projecting beyond the face of the disk. Upon the face of the disk a metal plate is adapted to be arranged, and said plate as well as the disk and the butt cap are provided with coinciding openings to receive a fastening rivet indicated at 24. The enlargement or bead 23 on the edge of the rubber disk 22 may be corrugated if desired. The purpose of this disk is to provide a yieldable contact surface for engagement with the body of the user and to also prevent slipping of the butt end of the rod as the same is swung in casting the line.

From the above it will be understood that when the spring balance scale is not in use, the same is entirely disposed within the rear hand grip and the butt cap 19 closes the open end of said bore. The pin 12 is so located and the link 13 of such length that the spring scale has sufficient longitudinal play within the tube 10 to permit the same to be withdrawn therefrom far enough for convenient use and also admit of the same being forced inwardly into the end of the tube to a sufficient extent to permit the hinged butt cap to be closed upon the end of the hand grip.

The reel seat, generally indicated by the numeral 6 is of the usual construction, the same being provided with a hood 6' at the forward end of the seat to receive one end of the reel frame in the usual manner. This reel seat is secured between the rear hand grip and a forward hand grip designated 34, in the manner hereinafter described. This seat is provided with a longitudinal rib at one end of which a socket is formed to receive an extension of the reel frame indicated at F. Upon the reel seat, a locking band or collar 25 is loosely arranged for longitudinal movement. This collar carries a longitudinally extending spring plate 26 which is provided with a plurality of openings 27. The reel frame F is provided with a second projection which extends longitudinally of the reel seat and over which the slidable band or collar 25 is adapted to be engaged. Upon the reel seat 6, a lug 28 is formed with which the spring plate 26 is adapted to be engaged, said lug being received in any one of the openings 27 in said plate whereby the collar 25 is securely held against rotary or longitudinal movement. In this manner the reel will be effectually locked upon its seat.

Upon the opposite side of the reel seat 6 to that upon which the reel is adapted to be arranged and adjacent the forward end of said seat, a finger receiving hook 29 is formed. A second hook 30 is adjustably mounted upon the rear end of said seat. This latter hook is formed upon or secured to a split band 31 which encircles the seat 6. The ends of this band are provided with ears which are apertured to receive a connecting bolt 32, a suitable clamping nut being threaded upon one end of said bolt. It will be observed that the hooks 29 and 30 are reversely curved the former toward the fore-grip and the latter toward the rear-grip. The forward hook is adapted to receive the forefinger of the hand and the rear hook one of the other fingers, thus giving a secure hold upon the rod and retaining the hand in proper position at all times.

The seat 6 is of course tubular in form and the hand grip 5 is provided at one end with a reduced longitudinal extension 33 to be fitted into one end of said seat member. A hand grip 34 is provided with a similar reduced extension 35 for insertion into the other end of the seat member. Each of these extensions is of a length equivalent to one half the length of the seat member so that their opposed ends will abut. The hand grip 34 and its extension are longitudinally bored to receive the rod section 7 which extends through the same and into the hollow handle 5 as previously explained. The forward grip 34 and the hand grip 5 are secured upon the rod section 7 by means of pins, cement or any other preferred manner, the reel seat 6, of course, being first placed in position. The hand grip 34 is formed with one or more flat surfaces (see Fig. 5) and may be of any desired polygonal form in cross section. This form of grip effectually overcomes the tendency of the rod to turn in the hand in the act of reeling.

The rod section 7 has marked upon it at a convenient place, scale graduations as indicated at 37. These graduations are preferably placed at a point about one foot from the butt end of the rod and may be extended upon the rod section 7 as far as is deemed advisable. The object of this scale is to provide convenient means for ascertaining the length of the fish.

From the foregoing description taken in connection with the accompanying drawings, it is though that the construction and purpose of the several novel features of my invention will be clearly understood. By means of the same a fishing rod is produced which is of strong and durable construction, may be manipulated with great facility and is capable of manufacture at comparatively small cost. It will also be obvious that the invention is susceptible of many modifications in form, proportion and arrangement of the several elements without departing from the essential features or sacrificing any of the advantages thereof.

Having thus described the invention, what is claimed is:

The combination with a fishing rod having a hollow handle, the bore of which is open at one end, of a scale arranged within the handle bore and including a casing and a balance spring arranged therein, a transversely disposed pin centrally mounted in the handle bore, an elongated loop connected to one end of the scale casing and slidable upon said pin whereby said scale may be extended beyond the open end of the bore, and means for closing the open end of the handle bore to retain the scale therein.

In testimony whereof I hereunto affix my signature in the presence of two witnesses.

ORTON A. TURNER.

Witnesses:
　Z. T. TURNER,
　F. G. CHIVERS.